United States Patent [19]

Wang

[11] Patent Number: 5,511,157
[45] Date of Patent: Apr. 23, 1996

[54] CONNECTION OF SLIDERS TO 3D OBJECTS TO ALLOW EASY USER MANIPULATION AND VIEWING OF OBJECTS

[75] Inventor: John S. Wang, Travis County, Tex.

[73] Assignee: International Business Machines Corporation, Armonk, N.Y.

[21] Appl. No.: 165,994

[22] Filed: Dec. 13, 1993

[51] Int. Cl.$^6$ .................................................. G06T 15/10
[52] U.S. Cl. ........................ 395/137; 395/155; 395/156; 395/161
[58] Field of Search ................................. 395/118, 119, 395/124, 125, 127, 159, 161, 157, 137, 155; 345/117–120

[56] References Cited

U.S. PATENT DOCUMENTS

| | | | |
|---|---|---|---|
| 5,067,167 | 11/1991 | Berger | 382/46 |
| 5,146,566 | 9/1992 | Hollis, Jr. et al. | 395/275 |
| 5,325,472 | 6/1994 | Horiuchi et al. | 395/127 |
| 5,359,703 | 10/1994 | Robertson et al. | 395/119 |

OTHER PUBLICATIONS

*The Showplace Companion,* Pixar, 1990, pp. 18, 76, 77, 103 and 107.
Chen et al., "A Study in Interactive 3–D Rotation Using 2–D Control Devices", Computer Graphics, vol. 22, No. 4, Aug. 1988, pp. 121–129.
*MacDraw Pro User's Guide,* Claris Corporation, 1991, pp. 2–7, 2–8.
J. M. Dinwiddie, et al.; "Combined–User Interface for Computers, Television, Video Recorders, and Telephone, Etc."; IBM Technical Disclosure Bulletin, vol. 33, No. 3B, Aug. 1990, pp. 116–118.
P. Appino, et al.; "3–D Slider Graphical Object"; IBM Technical Disclosure Bulletin, vol. 33, No. 6A, Nov. 1990, pp. 291–293.

*Primary Examiner*—Mark K. Zimmerman
*Assistant Examiner*—Stephen Hong
*Attorney, Agent, or Firm*—Whitham, Curtis, Whitham & McGinn; Mark S. Walker

[57] ABSTRACT

An easy to use method is practiced by the user of the computer system to allow for precise control of a displayed three dimensional object about any one of three perpendicular axes. A procedure is called which defines three "hot spots" for the X, Y and Z axes. These hot spots are displayed at the termini of displayed X, Y and Z axes having an origin at a centroid of the 3D object. The user then drags and drops sliders for each one of the axes, connecting each slider to one of the hot spots. Once connected the user may select a HIDE CONNECTION option and may further select a HIDE 3D AXES option so that the three sliders are displayed on the screen with the 3D object. Then by moving one or another of the sliders, the user may precisely rotate the 3D object about a corresponding axis to facilitate viewing of the object.

2 Claims, 9 Drawing Sheets

CONNECTION OF SLIDERS TO 3D OBJECTS TO ALLOW EASY USER MANIPULATION AND VIEWING OF OBJECTS

DESCRIPTION

BACKGROUND OF THE INVENTION

1. Field of the Invention

The present invention generally relates to graphic user interfaces (GUIs) for computer display screens and, more particularly, to an easy to use method for connecting sliders to a three dimensional (3D) object displayed on a computer display screen in order to allow the user to easily manipulate the 3D object by selectively rotating the object about X, Y and Z axes using the sliders.

2. Description of the Prior Art

Three dimensional (3D) objects are generated by a variety of application programs ranging from business and scientific graphic charting applications to computer aided design (CAD) and illustrator applications. Any 3D object will require rotation in order to let the user view the object from all aspects. For example, if the object is a 3D business or scientific chart some of the data represented by the chart will be obscured, and in order for the user viewing the chart to see all the data represented by the chart, the user needs to be able to rotate the chart about one or more axes. A computer generated 3D object produced by an illustrator or CAD application also needs to be rotated about the three cartesian X, Y and Z axes so that the designer will have a full appreciation of the shape and structure of the 3D object displayed on the computer screen.

One approach which has been implemented in the past in two dimensional (2D) space is to use a technique which involved a mouse directed cursor. The cursor when within certain limits of corners of a displayed object image bounding box, changes to a semicircular arc and, by pressing the mouse button and moving the mouse, the user could rotate the object in the 2D space. This technique has been applied to a 3D object depicted on the display, but since the depiction on the display is actually a two dimensional representation of the 3D object, it is difficult to control the rotation of the object. This is because mouse movement in two dimensional space does not map into three dimensional space precisely.

More sophisticated illustrator and CAD applications require the user to input either from the keyboard or by means of a pointing device, the coordinates of a view point in space. This approach is somewhat tedious and time consuming and often results in unpredictable results, requiring the user to input new coordinates until the desired viewing aspect is finally achieved on the computer display screen.

SUMMARY OF THE INVENTION

It is there/ore an object of the present invention to provide slider objects to allow easy, intuitive rotation about X, Y and Z axes.

According to the invention, there is provided an easy to use method which may be practiced by the user of the computer system to allow for precise control of a displayed three dimensional object about any one of three perpendicular axes. This is accomplished by calling a procedure which defines three "hot spots" for the X, Y and Z axes. These hot spots are displayed at the termini of displayed X, Y and Z axes having an origin at a centroid of the 3D object and terminating at an intersection of the image bounding box for the 3D object. The user then drags and drops sliders for each one of the axes, connecting each slider to one of the hot spots. Once connected, the user may select a HIDE CONNECTION option and may further select a HIDE 3D AXES option so that the three sliders are displayed on the screen with the 3D object. Then by moving one or another of the sliders, the user may precisely rotate the 3D object about a corresponding axis to facilitate viewing of the object.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
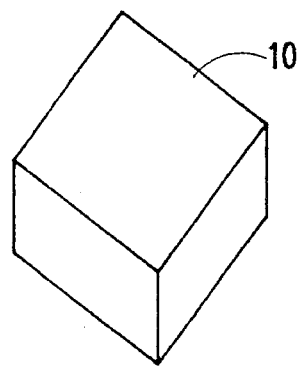
FIG. 1 is a depiction of a computer screen image of a 3D object.
Figure 2:
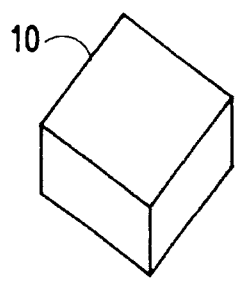
FIG. 2 is a depiction of the computer screen image showing the 3D object and a pop-up menu.
Figure 2:
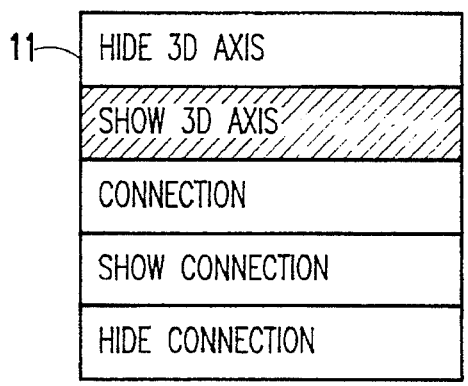
Figure 3:
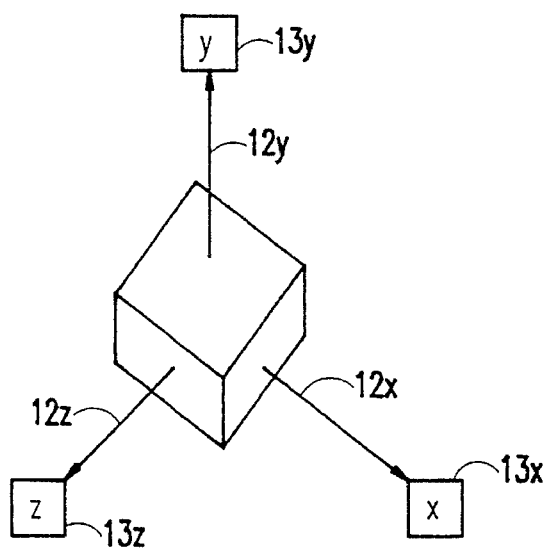
FIG. 3 is a depiction of the computer screen image showing the display of X, Y and Z axes terminating in "hot spots" after selection of SHOW 3D AXES.

Referring now to the drawings, and more particularly to FIG. 1, there is shown a 3D object 10 on the screen. If the user wants to manipulate the 3D object by rotating the object about any or all of the X, Y and Z axes, the user first clicks on the 3D object to select it and then activates a pop-up window 11, as shown in FIG. 2. Activating the pop-up window 11 may be done, for example, by clicking on the right button of a two-button mouse. From the menu in the pop-up window, the user selects SHOW 3D AXIS, which results in the display shown in FIG. 3 which superimposes the 3D axes 12 on the object, with the origin of the axes at the centroid of the object. Each of the X, Y and Z axes terminate in a "hot spot" 13 bearing the letter of the corresponding axis.

The locations of the "hot spots" are determined, in part, by the displayed image "bounding" box. A bounding box is conventionally used in the display of graphic images, whether 2D or 3D. Typically, the bounding box is hidden or invisible, but in some applications, the bounding box may be selectively viewed to assist the user in performing some manipulation of the graphic image, such as moving, sizing or rotating. In the practice of the invention, the intersections of the bounding box and the three axes determine the locations of the "hot spots". These hot spots facilitate the user connections of the axes to slider objects, as will become apparent from the following discussion.

Figure 4:
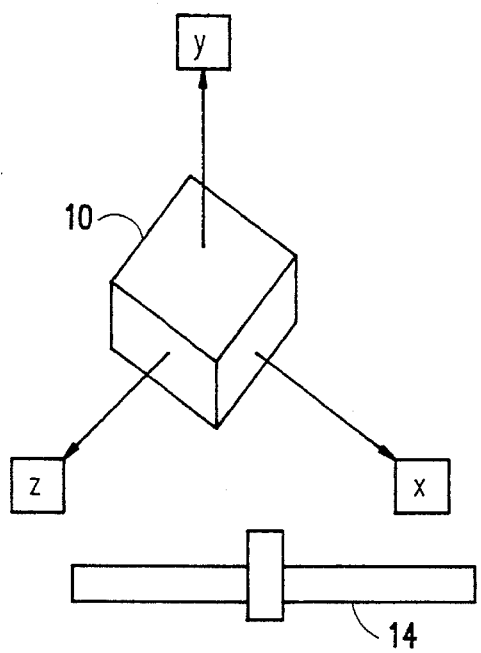
FIG. 4 is a depiction of the computer screen image with a first slider dropped on the screen.
Figure 5:
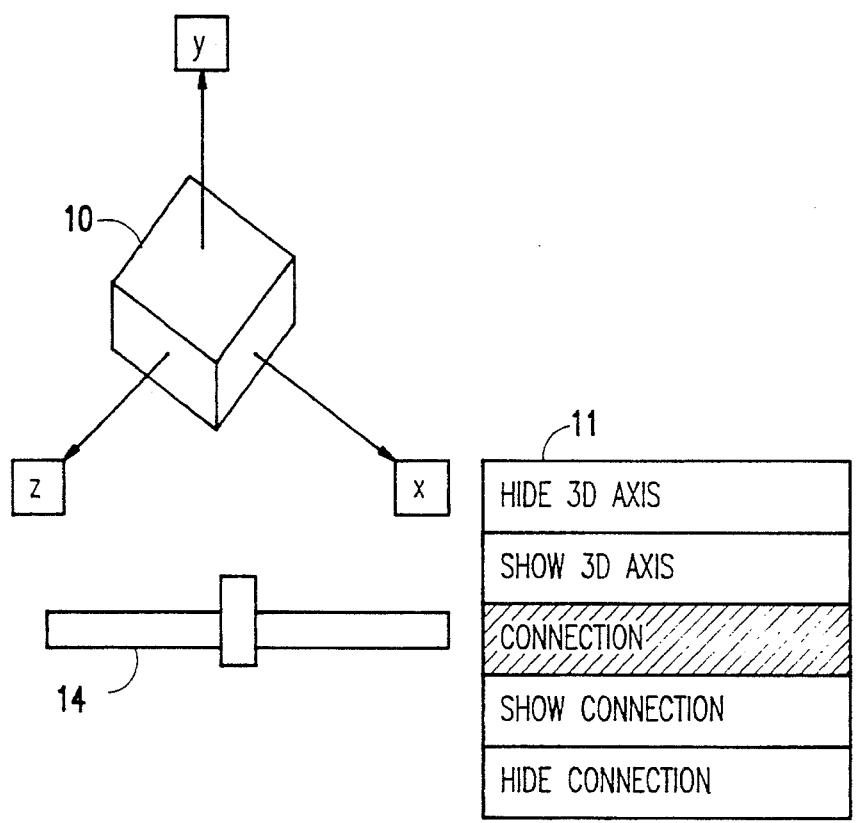
FIG. 5 is a depiction of the computer screen image showing the pop-up menu and the selection of CONNECT.
Figure 6:
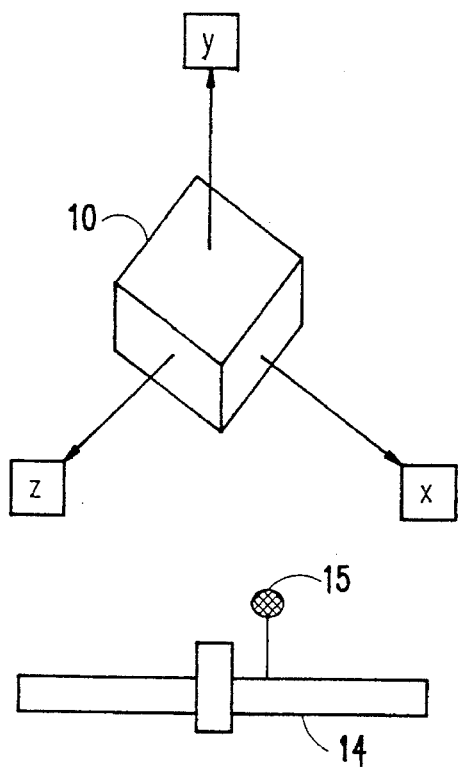
FIG. 6 is a depiction of the computer screen image showing a connection handle on the slider.
Figure 7:
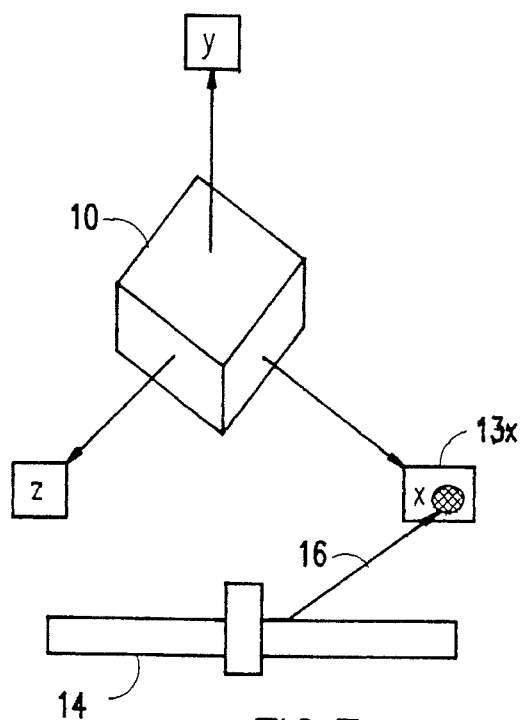
FIG. 7 Is a depiction of the computer screen image showing the connection handle dropped on the X hot spot.

The user next drags and drops a slider object 14 from a toolbox onto the 3D object window of the display screen as shown in FIG. 4. The pop-up window 11 is activated again in FIG. 5, and the user selects this time CONNECTION. This results in a handle 15 appearing on the slider, as shown in FIG. 6. The cursor may also change shape to confirm to the user that the process is now in the connect mode. Now, the user drags and drops the handle on the slider on top of the X-axis hot spot $13_x$. A rubber banding line 16 appears and follows the mouse pointer during this drag and drop operation. Once dropped and the connection made, the line is changed into an arrow tail emanating from the slider and terminating in an arrow head a the X hot spot. If the user fails to drop the connection on top of a hot spot, the rubber banding line 16 will disappear after the user releases the left mouse button. The disappearance of the rubber banding line indicates that the connection was not successful. The connection handle 15 is then redisplayed at the previous location next to the slider so that the user can try again.

Figure 8:
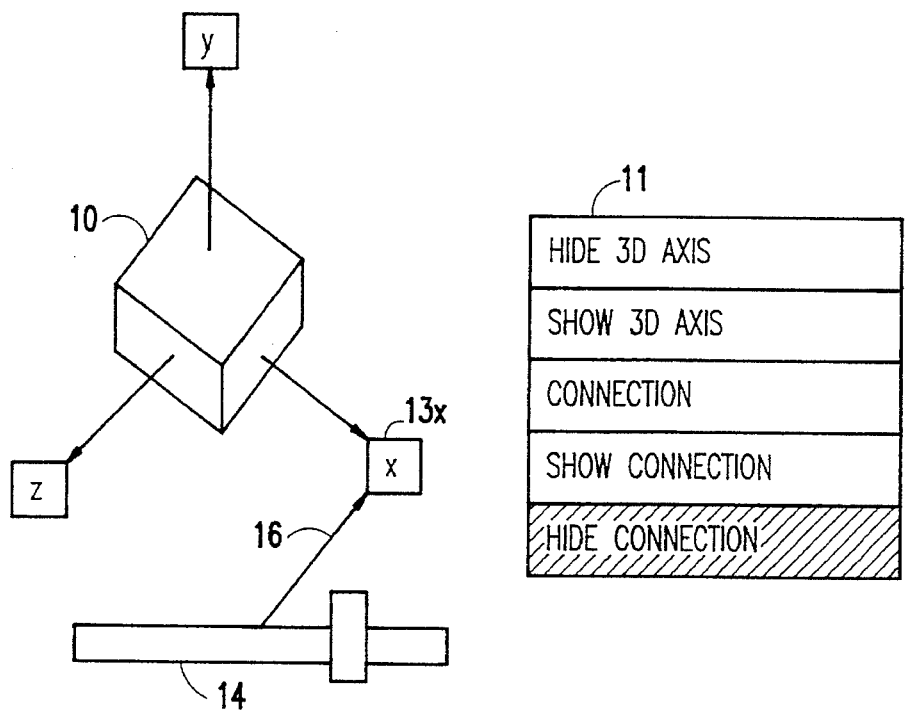
FIG. 8 is a depiction of the computer screen image showing the pop-up window and the selection of HIDE CONNECTION.
Figure 9:
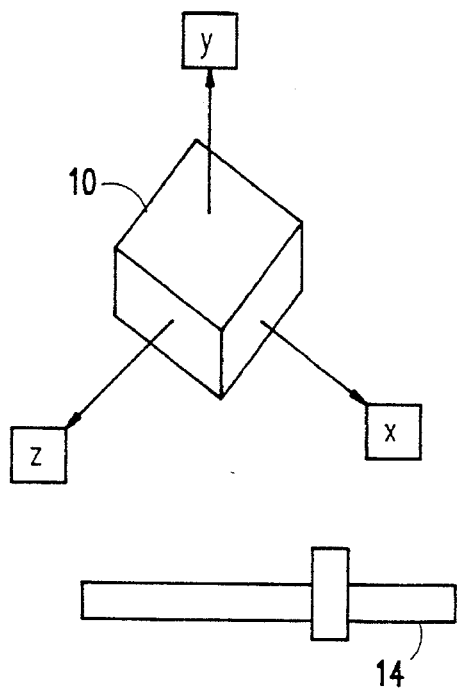
FIG. 9 is a depiction of the computer screen image after the connection line disappears.
Figure 10:
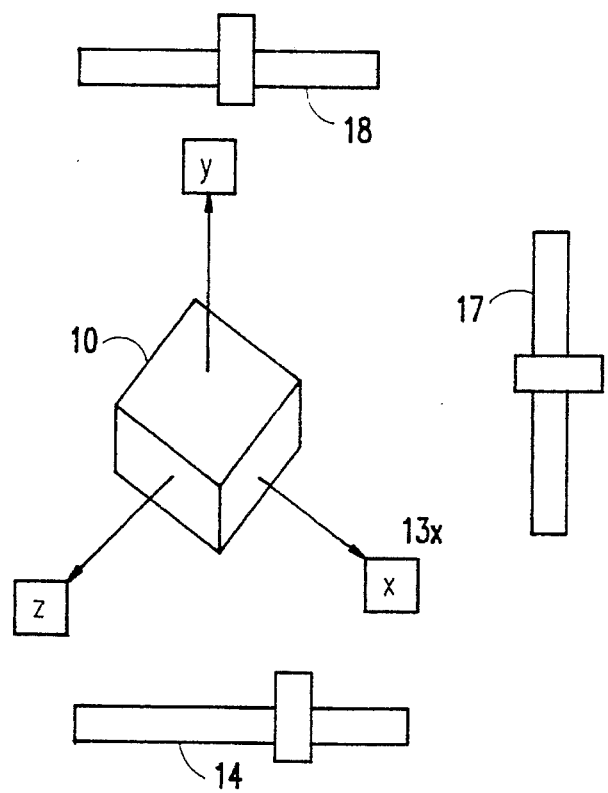
FIG. 10 is a depiction of the computer screen image after sliders have been added for the Y and Z axes.
Figure 11:
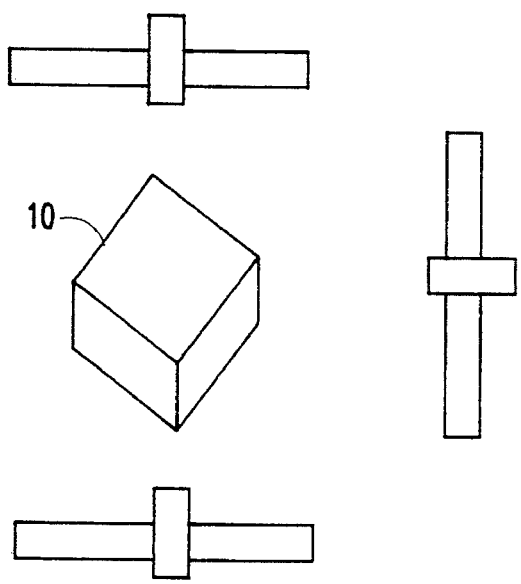
FIG. 11 is a depiction of the computer screen image after selecting HIDE 3D AXES.

After connection of the slider handle to the X-axis hot spot, the user may again activate the pop-up window 11 and select HIDE CONNECTION as shown in FIG. 8. FIG. 9 shows the display screen when HIDE CONNECTION is selected. The process is then repeated for each of the Y and Z axes, resulting in the display screen shown in FIG. 10, with sliders 17 and 18 for the Y and Z axes, respectively. Note that the user may place the sliders 14, 17 and 18 at any convenient locations on the display screen. The user may then activate the pop-up window again and this time select HIDE 3D AXIS to obtain the display shown in FIG. 11.

The preferred embodiment of the invention is practiced in the field of computer science known as object oriented programming (OOP). OOP is now the preferred environment for building user-friendly, intelligent computer software. Key elements of OOP are data encapsulation, inheritance and polymorphism. These elements may be used to generate a graphical user interface (GUI), typically characterized by a windowing environment having icons, mouse cursors and menus. While these three key elements are common to OOP languages, most OOP languages implement the three key elements differently.

Examples of OOP languages are Smalltalk, Object Pascal and C++. Smalltalk is actually more than a language; it might more accurately be characterized as a programming environment. Smalltalk was developed in the Learning Research Group at Xerox's Palo Alto Research Center (PARC) in the early 1970s. In Smalltalk, a message is sent to an object to evaluate the object itself. Messages perform a task similar to that of function calls in conventional programming languages. The programmer does not need to be concerned with the type of data; rather, the programmer need only be concerned with creating the right order of a message and using the right message. Object Pascal is the language used for Apple's Macintosh® computers. Apple developed Object Pascal with the collaboration of Niklaus Wirth, the designer of Pascal. C++ was developed by Bjarne Stroustrup at the AT&T Bell Laboratories in 1983 as an extension of C, which is the language in which the Unix® operating system is written. The key concept of C++ is class, which is a user-defined type. Classes provide object oriented programming features and typically has two kinds of clients called instances and subclasses. C++ modules are compatible with C modules and can be linked freely so that existing C libraries may be used with C++ programs. The preferred embodiment of the invention is written in C++.

The most widely used object based and object oriented programming languages trace their heritage to Simula developed in the 1960s by O-J. Dahl, B. Myhrhaug and K. Nygard of Norway. Further information on the subject of Object Oriented Programming may be had by reference to *Object Oriented Design with Applications* by Grady Booch, The BenjiminCummings Publishing Co., Inc., Redwood City, Calif. (1991 ), and *An Introduction to Object-Oriented Programming* by Timothy Budd, Addison-Wesley Publishing Co. (1991).

Object oriented design is used to implement the invention. Objects have properties and methods and objects such as a slider can be dragged out of the toolbox and dropped in an application window. The user may draw a connection from the source object to the target object, and after the connection is made the source object event will trigger a target object action (or method). The object will receive user events such as a button press or a slider move and release. Thus, when the user is moving the slider which connects to the 3D object, the target object redisplay method will be called with the new slider position. The 3D object will be redisplayed according to the new angles controlled by the slider.

Figure 12:
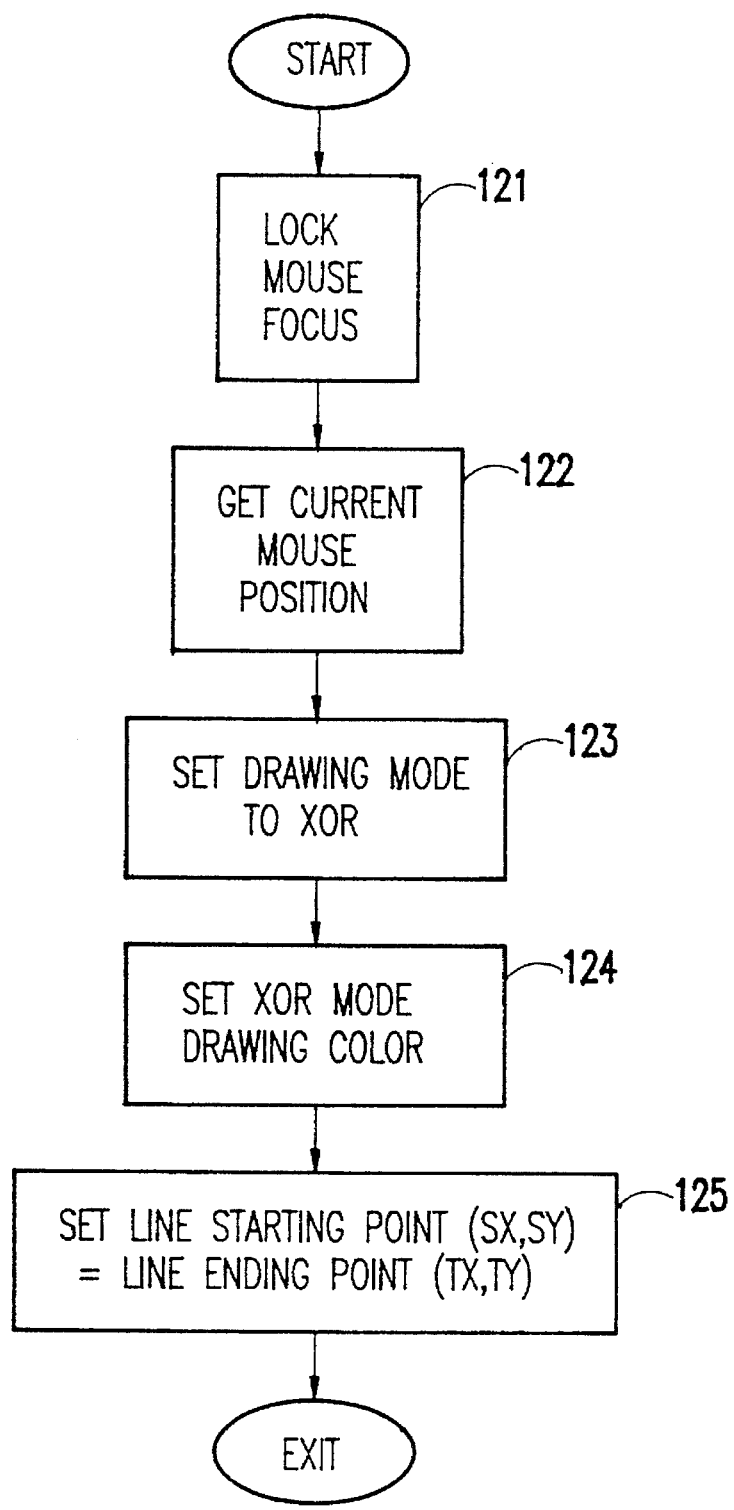
FIG. 12 is a flow diagram showing the method that handles a mouse button 1 press event during the CONNECT mode.

FIG. 12 is a flow diagram of the method which handles the mouse button 1 press event during the connection mode. The first step in the process is to lock the mouse focus in function block 121. Next, in function block 122 the current mouse position is obtained. The drawing mode is set to Exclusive OR (XOR) in function block 123, and the XOR mode is set to the drawing color in function block 124. These two operations are how the mouse cursor and objects attached to the mouse cursor are displayed over the screen image. Finally, the line starting point is set to equal the line ending point in function block 125. At the completion of this method, the mouse cursor is initialized to permit the user to drag and drop objects including lines that indicate linkages between objects.

The following pseudocode implements the method illustrated in FIG. 12.

```
METHOD MOUSE_BUTTON_1_PRESSED
    LOCK MOUSE FOCUS
    GET THE CURRENT MOUSE POSITION
    SET THE DRAWING MODE FOR XOR
    SET THE XOR MODE DRAWING COLOR
    SET LINE STARTING POINT (SX,SY) =
        LINE ENDING POINT (TX,TY)
ENDMETHOD
```

Figure 13:
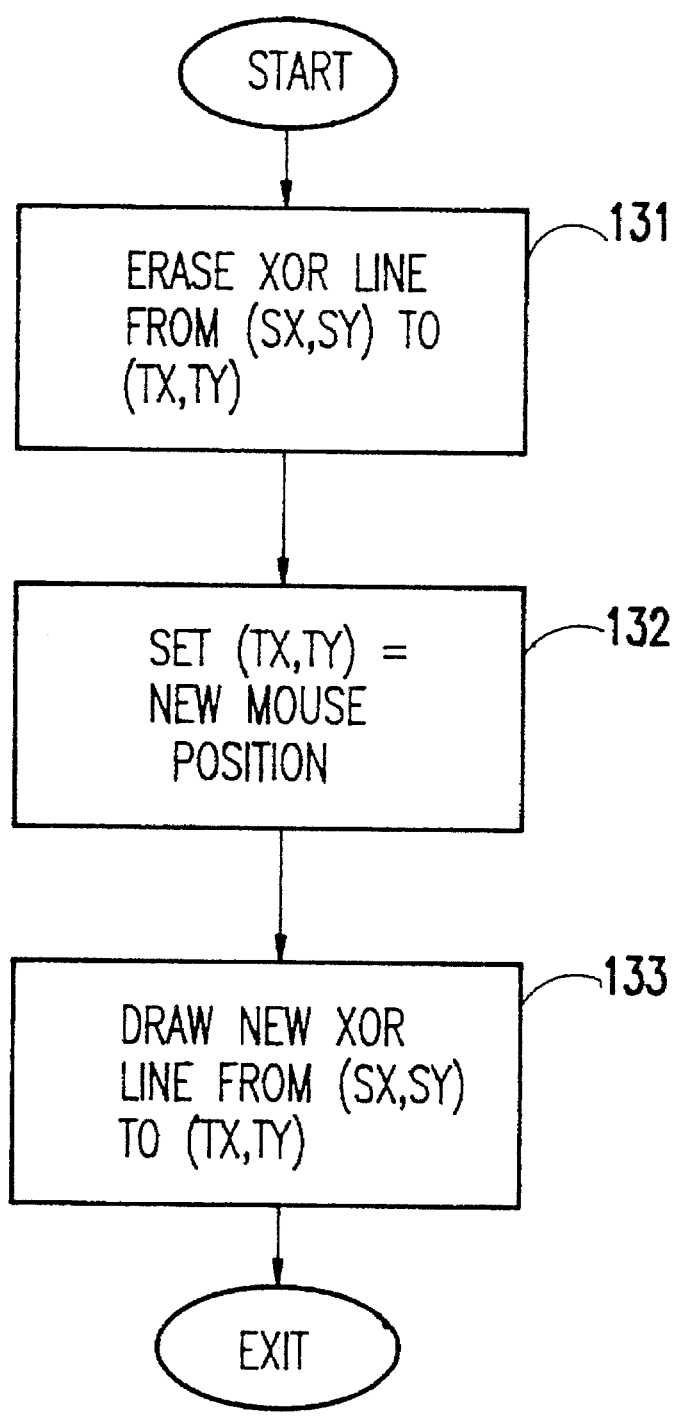
FIG. 13 is a flow diagram showing the method that handles a mouse button 1 move event during the CONNECT mode.

FIG. 13 is a flow diagram of the method which handles the mouse button 1 move event during the connection mode.

The first step in the method is to erase the XOR line from the starting point to the ending point in function block 131. Next, in function block 132, the ending point is set to the new mouse position. And finally, in function block 133, a new XOR line is drawn from the starting point to the ending point.

The following pseudocode implements the method illustrated in FIG. 13.

```
METHOD MOUSE_BUTTON_1_MOVED
    ERASE XOR LINE FROM (SX,SY) TO (TX,TY)
    SET (TX,TY) = THE NEW MOUSE POSITION
    DRAW THE NEW XOR LINE FROM (SX,SY)
        TO (TX,TY)
ENDMETHOD
```

Figure 14:
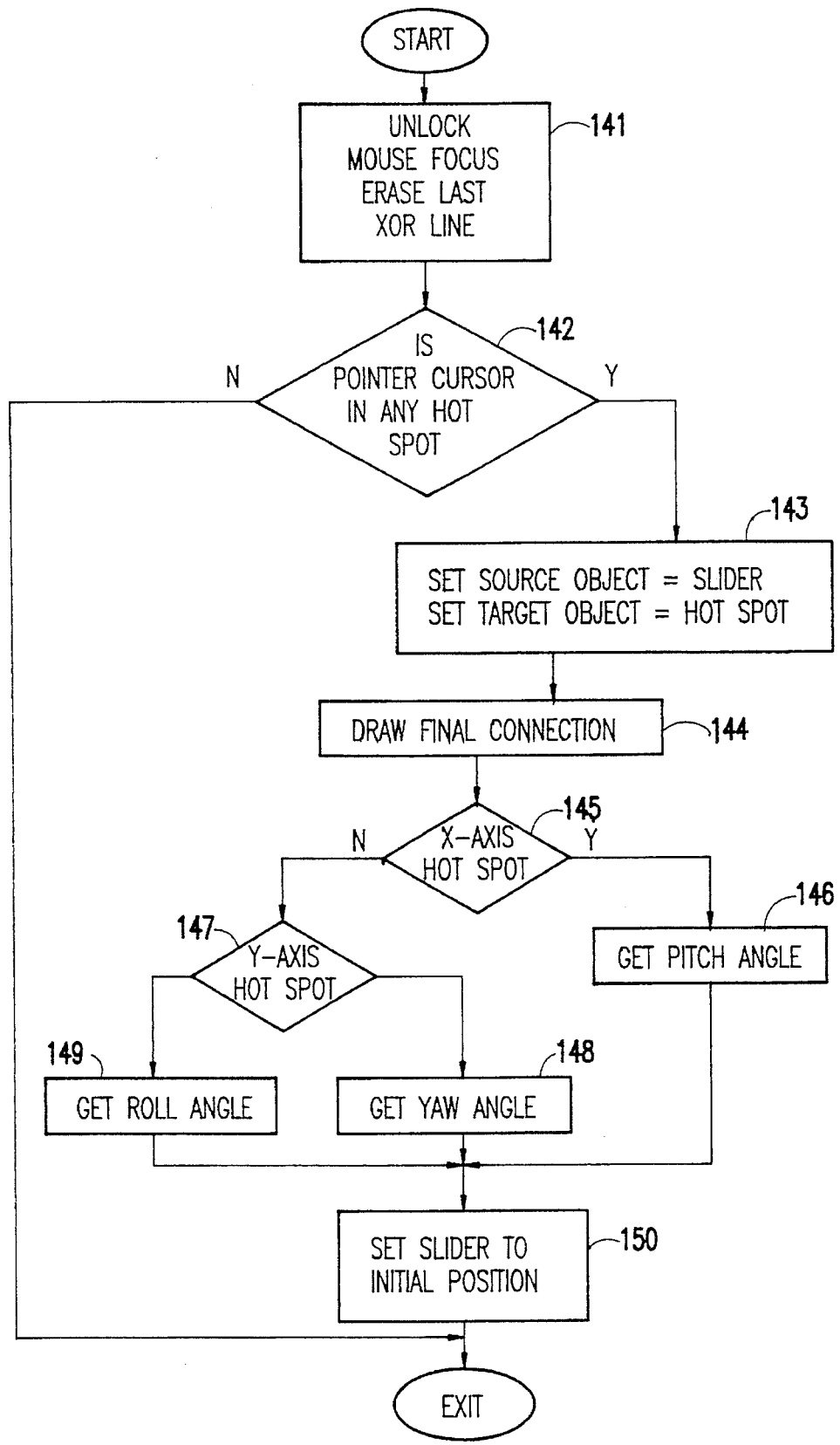
FIG. 14 is a flow diagram showing the method that handles the mouse button 1 release event during the CONNECT mode.

FIG. 14 is a flow diagram of the method which handles the mouse button 1 release event during the connection mode. The mouse focus is first unlocked and the last XOR line is erased in function block 141. Then a test is made in decision block 142 to determine if the pointer cursor is in any "hot spot". If not, the process exits, but if so, the source object is set to the slider and the target object is set to the hot spot in function block 143. To provide visual feedback for the user, a line in the form of an arrow is drawn between the source and target objects in function block 144. A test is next made in decision block 145 to determine if the hot spot is the X-axis hot spot. If so, the pitch angle is obtained in function block 146; otherwise, a second test is made in decision block 147 to determine if the hot spot is the Y-axis hot spot. If so, the yaw angle is obtained in function block 148; otherwise, the roll angle is obtained in function block 149. Depending on the angle obtained (i.e., pitch, yaw or roll), the corresponding slider is set to an initial position for that angle in function block 150.

The following pseudocode implements the method illustrated in FIG. 14.

```
METHOD MOUSE_BUTTON_1_RELEASED
    UNLOCK THE MOUSE FOCUS
    ERASE THE LAST XOR LINE FROM (SX,SY) TO
        (TX,TY)
    IF (POINTER IS IN THE HOT SPOT)
        SET SOURCE OBJECT = THE CURRENT SLIDER
        SET TARGET OBJECT = THE HOT SPOT
        DRAW THE FINAL LINK WITH LINK TAIL AND
            LINK HEAD
        IF (THE HOT SPOT = X-AXIS HOT SPOT)
            GET THE 3D OBJECT PITCH ANGLE
                (X-AXIS ROTATION)
        ELSE IF (THE HOT SPOT = Y-AXIS HOT SPOT)
            GET THE 3D OBJECT YAW ANGLE (Y-AXIS
                ROTATION)
        ELSE IF (THE HOT SPOT = Z-AXIS HOT SPOT)
            GET THE 3D OBJECT ROLL ANGLE (Z-AXIS
                ROTATION)
        ENDIF
        SET THE SLIDER INITIAL POSITION
    ENDIF
ENDMETHOD
```

Figure 15:
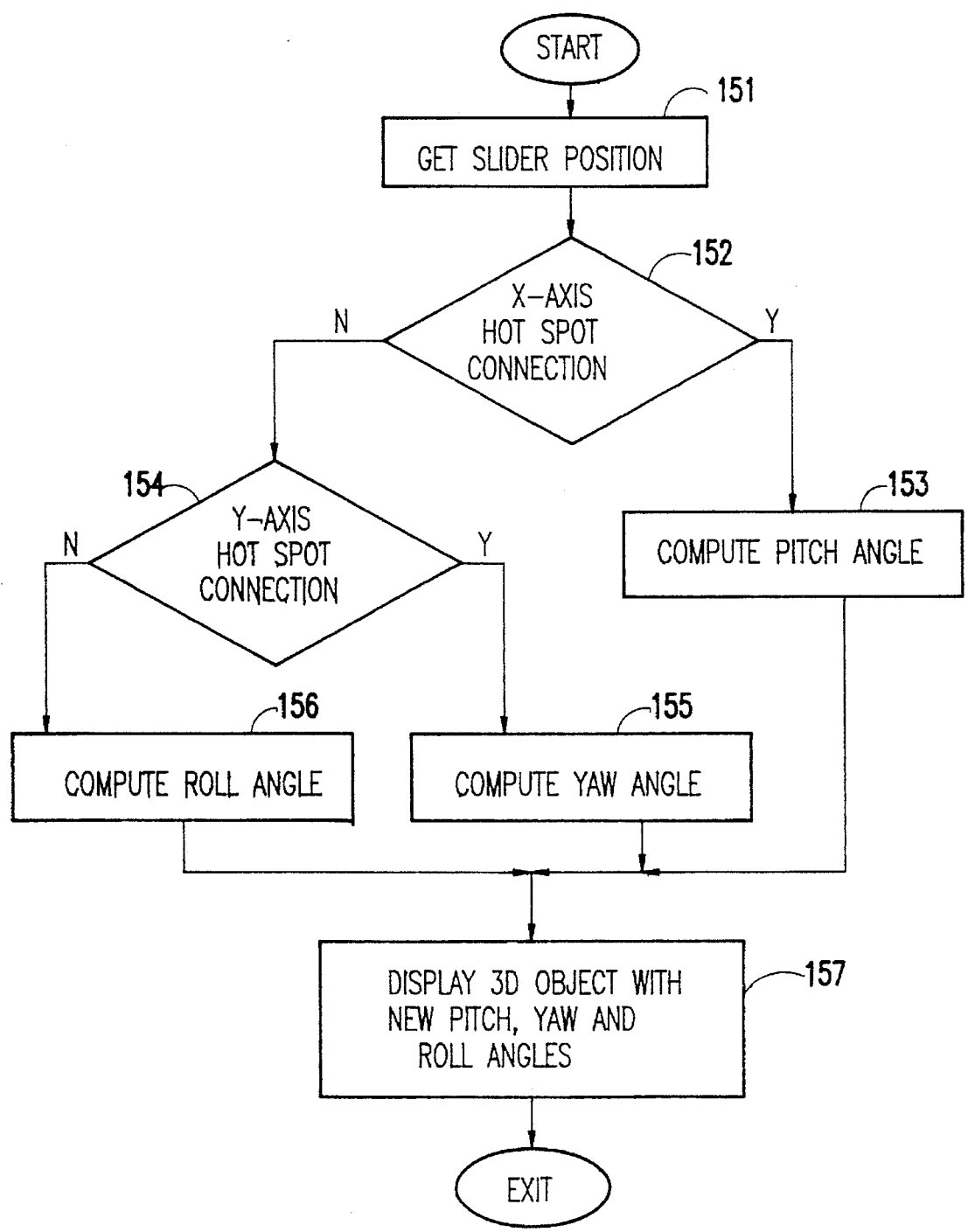
FIG. 15 is a flow diagram showing the method that handles the display of the 3D object.

FIG. 15 is a flow diagram of the method which handles the display of the 3D object. The slider position is obtained in function block 151. A test is then made in decision block 152 to determine if the slider is connected to the X-axis hot spot. If so, the pitch angle is computed in function block 153; otherwise, a test is made in decision block 154 to determine if the slider is connected to the Y-axis hot spot. If so, the yaw angle is computed in function block 155; otherwise, the roll angle is computed in function block 156. Depending on the angle computed (i.e., pitch, yaw or roll), the 3D object is displayed with the new angle set in function block 157.

The following pseudocode implements the method illustrated in FIG. 15.

```
METHOD 3D_DISPLAY
    GET THE SLIDER POSITION
    IF (THE MOVING CURSOR IS CONNECTED TO
    THE X-
        AXIS HOT SPOT)
        COMPUTE THE NEW PITCH ANGLE
        ACCORDING TO
THE SLIDER POSITION
    ELSE
        IF (THE MOVING SLIDER IS CONNECTED
        TO THE
            Y-AXIS HOT SPOT)
            COMPUTE THE NEW YAW ANGLE
            ACCORDING
                TO THE SLIDER POSITION
        ELSE
            COMPUTE THE NEW ROLL ANGLE
            ACCORDING
                TO THE SLIDER POSITION
        ENDIF
    ENDIF
    DISPLAY THE 3D_OBJECT ACCORDING
    TO THE NEW
        PITCH ANGLE, YAW ANGLE AND ROLL
        ANGLE
ENDMETHOD
```

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of precisely controlling the rotation of a computer displayed three dimensional (3D) object about three mutually perpendicular axes on a computer display screen comprising the steps of:

responding to a user selection of a displayed 3D object followed by a user activation of a selection of display three mutually perpendicular axes by calling a procedure which defines a "hot spot" for each of the three axes, a "hot spot" being a displayed object at an end of a corresponding axis;

responding to a user selection of a slider object from a toolbox followed by a user drag and drop of the slider object on the display screen by displaying the slider at a location in an application window on the display screen where the slider object is dropped by the user and repeating this procedure until the user has positioned three sliders at desired locations on the display screen for connection to a respective one of the axes, the "hot spot" at an end of an axis facilitating a user connection of the axis to a corresponding slider object;

responding to a user activation of a connection procedure by generating a rubber banding line from a slider object to a pointing cursor moved by the user;

responding to a user drop of the rubber banding line on a hot spot by changing the rubber banding line to an arrow to show that a connection has been made from the slider object to an axis corresponding to the hot spot and repeating this procedure until all slider objects positioned on the display screen by the user have been connected to a corresponding axis; and responding to a movement of each of the three slider objects by the user by calling a redisplay method in the displayed 3D object to rotate the display of the displayed 3D object corresponding to new viewing angles controlled by the slider objects, the slider objects permitting the user to precisely control rotation of the displayed object about the three mutually perpendicular axes.

2. An apparatus for enabling a user to precisely control the rotation of a computer displayed three dimensional (3D) object about mutually perpendicular axes on a computer display screen comprising:

selection means for responding to a user selection of a displayed 3D object using a cursor control device, said selection means providing a visual feedback to the user upon selection of the 3D object and further responding to a user activation of a selection of three mutually perpendicular display axes by calling a procedure which defines a "hot spot" for each axis, a "hot spot" being a displayed object at an end of the one axis and the slider object permitting the user to precisely control rotation of the displayed object;

a toolbox database from which a user may select a slider object and drag and drop the slider on the display screen using the cursor control device, the user repeating this procedure three times so that each slider object is displayed at a different location in an application window on the display screen where the slider object is dropped by the user, a "hot spot" on an axis facilitating a user connection of the axis to a corresponding slider object;

command means for responding to a user activation of a connection procedure by generating a rubber banding line from a slider object to a pointing cursor moved by the user using the cursor control device, said rubber banding line when dropped on a hot spot being changed to an arrow to show that a connection has been made from the slider object to an axis corresponding to the hot spot; and calculation means responding to a movement of each of the three slider objects by the user for calling a redisplay method in the displayed 3D object to rotate the display of the displayed 3D object corresponding to new viewing angles controlled by the slider objects.

* * * * *